(12) United States Patent
Tanaka et al.

(10) Patent No.: US 10,602,531 B2
(45) Date of Patent: Mar. 24, 2020

(54) COMMUNICATION SYSTEM, COMMUNICATION METHOD, AND BASE STATION

(71) Applicant: FUJITSU LIMITED, Kawasaki-shi, Kanagawa (JP)

(72) Inventors: Yoshinori Tanaka, Yokohama (JP); Tsuyoshi Shimomura, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/021,921

(22) Filed: Jun. 28, 2018

(65) Prior Publication Data
US 2018/0310326 A1    Oct. 25, 2018

Related U.S. Application Data

(63) Continuation of application No. PCT/JP2016/050574, filed on Jan. 8, 2016.

(51) Int. Cl.
*H04W 72/12* (2009.01)
*H04W 72/04* (2009.01)
(Continued)

(52) U.S. Cl.
CPC ......... *H04W 72/12* (2013.01); *H04L 27/2602* (2013.01); *H04W 56/00* (2013.01);
(Continued)

(58) Field of Classification Search
CPC ....... H04B 7/26; H04L 27/26; H04L 27/2602; H04W 56/00; H04W 72/04;
(Continued)

(56) References Cited

U.S. PATENT DOCUMENTS 9,854,602 B2 * 12/2017 Tabet .................... H04L 5/0053
10,327,231 B2 * 6/2019 Aiba ..................... H04L 5/0007
(Continued)

FOREIGN PATENT DOCUMENTS

JP        2006-54597 A    2/2006
JP        2011-507334 A   3/2011
(Continued)

OTHER PUBLICATIONS

Mediatek Inc., "Technology & Standardization for 5G", Agenda Item: 2, 3GPP Workshop on 5G, RWS-150053, Phoenix, AZ, USA, Sep. 17-18, 2015.
(Continued)

*Primary Examiner* — Ayaz R Sheikh
*Assistant Examiner* — Debebe A Asefa
(74) *Attorney, Agent, or Firm* — Myers Wolin, LLC

(57) ABSTRACT

A communication system for which a first time period and a second time period different from the first time period are set in each of predetermined time intervals, includes: a base station; a first terminal configured to execute radio transmission between the first terminal and the base station in either one of an uplink and a downlink during the first time period and radio transmission between the first terminal and the base station in the other one of the uplink and the downlink in a direction opposite to the first time period during the second time period; and a second terminal configured to execute radio transmission between the second terminal and the base station in a link in the same direction as the first terminal during the first time period and does not execute radio transmission between the second terminal and the base station during the second time periods.

6 Claims, 9 Drawing Sheets

(51) Int. Cl.
| | |
|---|---|
| *H04W 56/00* | (2009.01) |
| *H04L 27/26* | (2006.01) |
| *H04W 76/27* | (2018.01) |
| *H04W 92/10* | (2009.01) |
| *H04B 7/26* | (2006.01) |

(52) U.S. Cl.
CPC ....... *H04W 72/04* (2013.01); *H04W 72/0406* (2013.01); *H04W 72/0453* (2013.01); *H04W 76/27* (2018.02); *H04W 92/10* (2013.01); *H04B 7/26* (2013.01); *H04L 27/26* (2013.01)

(58) Field of Classification Search
CPC ......... H04W 72/0406; H04W 72/0453; H04W 72/12; H04W 76/27; H04W 92/10
See application file for complete search history.

(56) References Cited

U.S. PATENT DOCUMENTS

| | | |
|---|---|---|
| 2006/0034239 A1 | 2/2006 | Abeta et al. |
| 2009/0147742 A1 | 6/2009 | Tsai et al. |

FOREIGN PATENT DOCUMENTS

| | | |
|---|---|---|
| JP | 2013-207384 A | 10/2013 |
| WO | 2013/149651 A1 | 10/2013 |

OTHER PUBLICATIONS

International Search Report with Written Opinion of the International Searching Authority issued for corresponding International Patent Application No. PCT/JP2016/050574, dated Feb. 9, 2016, with a partial English translation.

Dr. Chih-Lin I, "Quest for 5G—Rethink Fundamentals", First International IEEE 5G Summit, Princeton, NJ, May 26, 2015.

Smee, "5G Vision and Design", IEEE 5G Summit, Silicon Valley, Nov. 16, 2015.

Notification of Reasons for Refusal issued by the Japan Patent Office for corresponding Japanese Patent Application No. 2017-560022, dated Jan. 8, 2019. English translation attached.

Qualcomm, "5G Views on Technology & Standardization",RWS-150012, 3GPP RAN workshop on 5G, Phoenix, USA, Sep. 2, 2015.

Fujitsu, "TDD frame structure with mixed numerology", Agenda Item: 7.1.4, 3GPP TSG-RAN WG1 Meeting #85, R1-164331, Nanjing, China, May 23-27, 2016.

Extended European search report with supplementary European search report and the European search opinion issued by the European Patent Office for corresponding European Patent Application No. 16883638.5, dated Dec. 10, 2018.

* cited by examiner

COMMUNICATION SYSTEM, COMMUNICATION METHOD, AND BASE STATION

CROSS-REFERENCE TO RELATED APPLICATION

This application is a continuation application of International Application PCT/JP2016/050574 filed on Jan. 8, 2016 and designated the U.S., the entire contents of which are incorporated herein by reference.

FIELD

The present invention relates to a communication system, a communication method, and a base station.

BACKGROUND

Traditionally, mobile communication systems such as 3rd-generation (3G) mobile communication systems, LTE corresponding to 3.9-generation mobile communication systems, LTE-Advanced corresponding to 4th-generation mobile communication systems, and 5th-generation mobile communication systems are known. LTE stands for Long Term Evolution.

For example, regarding 5th-generation mobile communication systems, it has been considered that multiple types of OFDM-based communication in which symbol lengths (subcarrier spacings) are different are frequency-multiplexed (refer to, for example, the following Non-Patent Literature 1). OFDM stands for Orthogonal Frequency Division Multiplexing).

Examples of the related art include "Non-Patent Literature 1 [Technology & Standardization for 5G", 3GPP RWS-150053, September, 2015]".

SUMMARY

According to an aspect of the invention, a communication system, for which a first time period and a second time period different from the first time period are set in each of predetermined time intervals, includes: a base station; a first terminal configured to execute radio transmission between the first terminal and the base station in either one of an uplink and a downlink during a first time period and radio transmission between the first terminal and the base station in the other one of the uplink and the downlink in a direction opposite to the first time period during a second time period in each of the predetermined time intervals; and a second terminal that is different from the first terminal and is configured to execute radio transmission between the second terminal and the base station in a link in the same direction as the first terminal during a first time period in each of the predetermined time intervals and does not execute radio transmission between the second terminal and the base station during the second time periods.

The object and advantages of the invention will be realized and attained by means of the elements and combinations particularly pointed out in the claims.

It is to be understood that both of the foregoing general description and the following detailed description are exemplary and explanatory and are not restrictive of the invention, as claimed.

DESCRIPTION OF EMBODIMENTS

However, in the aforementioned conventional technique, for example, if communication of multiple terminals is frequency-multiplexed, and an uplink and a downlink are time-division multiplexed, boundaries between the uplink and the downlink are set in units of the longest symbol length in the communication to be frequency-multiplexed.

Thus, for example, it may be difficult to frequency-multiplex multiple types of communication in which delay amounts that are time from the transmission of certain data to the transmission of the next data due to the transmission of response signals to the certain data or the like are different.

According to an aspect, an object of the invention is to provide a communication system, a communication method, and a base station that enable frequency multiplexing of multiple types of communication in which delay amounts are different.

Hereinafter, embodiments of a communication system, a communication method, and a base station according to the invention are described in detail with reference to the accompanying drawings.

First Embodiment

<Communication System According to First Embodiment>

Figure 1:
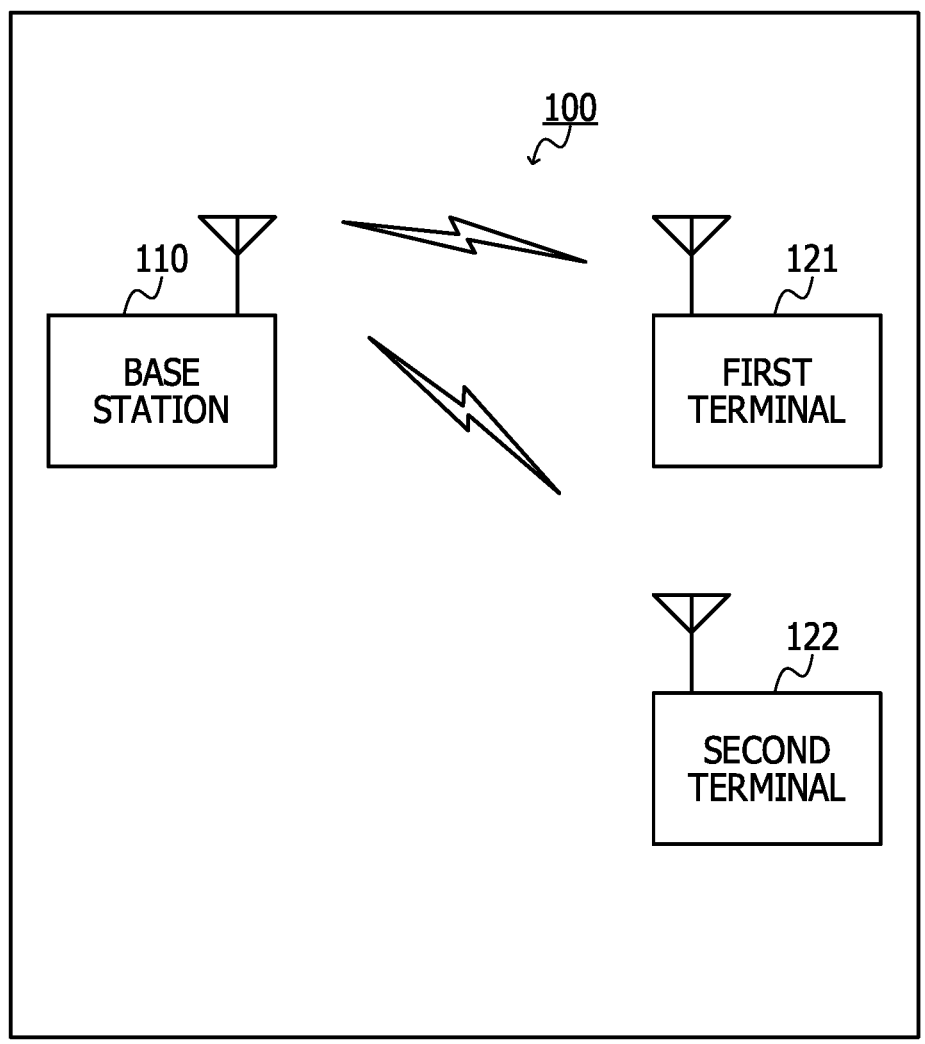
FIG. 1 illustrates an example of a communication system according to a first embodiment.

FIG. 1 illustrates an example of a communication system according to a first embodiment. As illustrated in FIG. 1, the communication system 100 according to the first embodiment includes a base station 110, a first terminal 121, and a second terminal 122. In the communication system 100, radio transmission in a DL (downlink) and radio transmission in a UL (uplink) are executed based on TDD (time division duplex).

The radio transmission in the DL is the transmission of a radio signal from the base station 110 to the first terminal 121 or the second terminal 122. The radio transmission in the UL is the transmission of a radio signal from the first terminal 121 or the second terminal 122 to the base station 110.

For example, the base station 110 executes scheduling to allocate radio resources to radio transmission of the first and second terminals 121 and 122 in the DL and the UL. Then, the base station 110 wirelessly transmits control information indicating results of the scheduling to the first terminal 121 and the second terminal 122 and executes radio transmission between the base station 110 and the first and second terminals 121 and 122 in the DL and the UL based on the results of the scheduling.

The first terminal 121 and the second terminal 122 receive the control information wirelessly transmitted by the base station 110 and execute radio transmission between the first and second terminals 121 and 122 and the base station 110 in the DL and the UL based on the results of the scheduling.

<Scheduling in Communication System According to First Embodiment>

Figure 2:
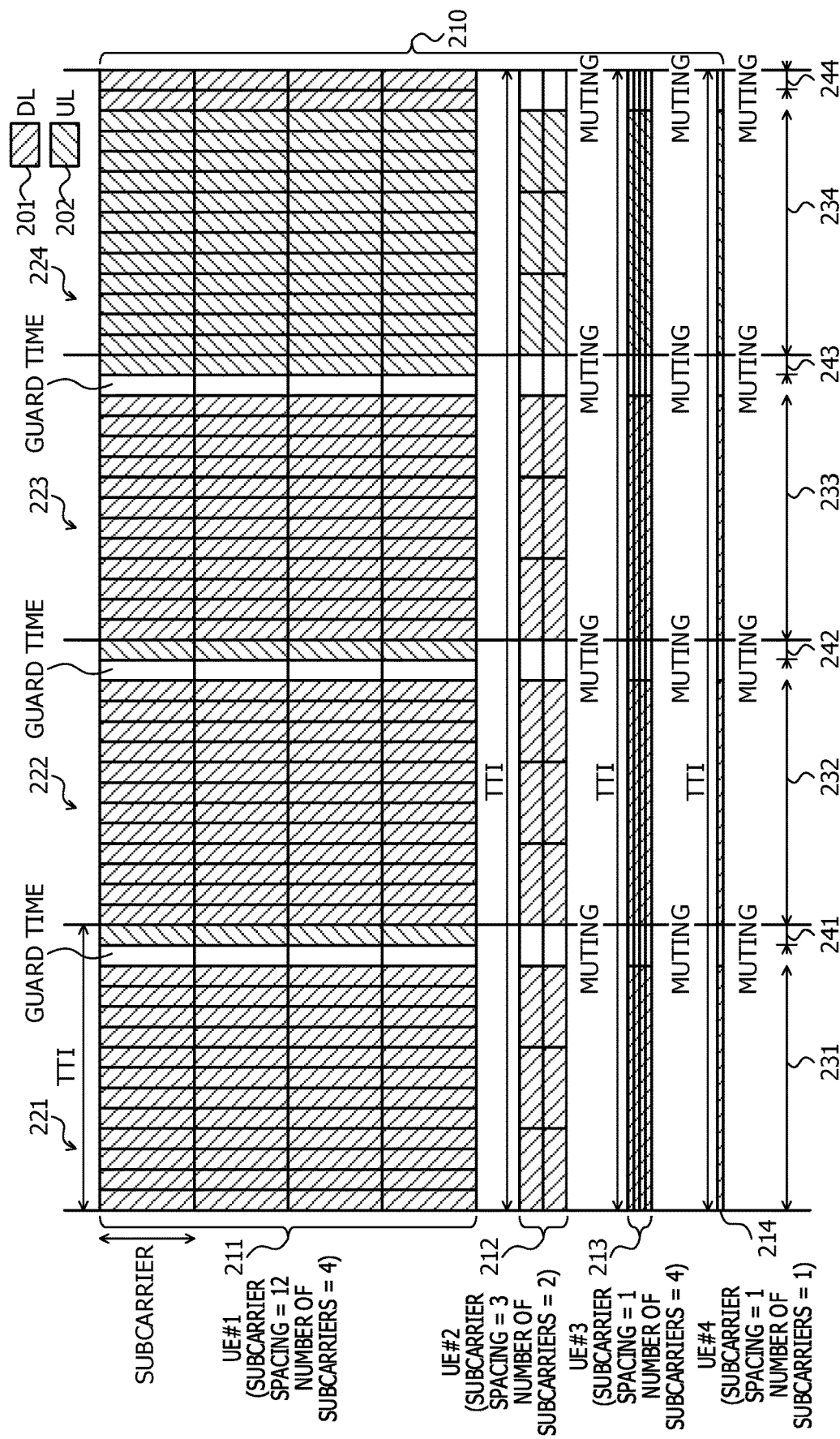
FIG. 2 illustrates an example of scheduling in the communication system according to the first embodiment.

FIG. 2 illustrates an example of the scheduling in the communication system according to the first embodiment. The base station 110 according to the first embodiment allocates radio resources including subcarrier spacings (or symbol lengths) different for traffic and TTIs in OFDM-based multicarrier transmission.

Each of the TTIs (transmission time intervals) is, for example, a time period (for example, a single transport block) from the transmission of a single data item to the transmission of the next data item. In addition, the base station 110 according to the first embodiment may allocate radio resources including the numbers of subcarriers that are different for traffic and CP (cyclic prefix) lengths in the OFDM-based multicarrier transmission.

In FIG. 2, a horizontal direction indicates time resources and a vertical direction indicates frequency resources. UEs #1 to #4 are UEs (user equipments), each of which that may wirelessly communicate an OFDM signal with the base station 110. The first terminal 121 illustrated in FIG. 1 may be achieved by the UE #1, for example. The second terminal 122 illustrated in FIG. 1 may be achieved by the UEs #2 to #4, for example. A system band 210 is a frequency band that may be allocated by the base station 110 to radio transmission between the base station 110 and the UEs #1 to #4.

Oblique lines 201 indicate radio resources allocated by the base station 110 to the DL. Oblique lines 202 indicate radio resources allocated by the base station 110 to the UL. In the example illustrated in FIG. 2, the base station 110 allocates frequency bands 211 to 214 to traffic of the UEs #1 to #4.

In addition, in the example illustrated in FIG. 2, the traffic of the UE #1 is traffic for which low-latency feedback for transmitted data is requested on a priority basis, compared with the traffic of the UEs #2 to #4. Such traffic is, for example, traffic of an application such as an AR (augmented reality) or a game. The traffic of the UEs #2 to #4 is traffic for which wide coverage and low consumption power are requested on a priority basis, compared with the traffic of the UE #1. Such traffic is, for example, sensing data transmitted and received in a sensor network.

For example, the frequency band 211 in which a subcarrier spacing is 12 and the number of subcarriers is 4 is allocated to the UE #1. The frequency band 212 in which a subcarrier spacing is 3 and the number of subcarriers is 2 is allocated to the UE #2. The frequency band 213 in which a subcarrier spacing is 1 and the number of subcarriers is 4 is allocated to the UE #3. The frequency band 214 in which a subcarrier spacing is 1 and the number of subcarriers is 1 is allocated to the UE #4.

As a subcarrier spacing is longer, a symbol length of an OFDM signal is shorter. For example, in the example illustrated in FIG. 2, the subcarrier spacing of the UE #1>the subcarrier spacing of the UE #2>the subcarrier spacing of the UE #3=the subcarrier spacing of the UE #4, and a symbol length of the UE #1<a symbol length of the UE #2<a symbol length of the UE #3=a symbol length of the UE #4.

The base station 110 applies the self-contained subframe to the traffic of the UE #1 for which low-latency feedback for transmitted data is requested on a priority basis. The self-contained subframe is a technique for allocating the DL and the UL to a single subframe. This reduces a TTI from the transmission of data from the UE #1 to the base station 110 in the DL to the transmission of a response signal (ACK or NACK) to the data from the base station 111 to the UE #1 in the UL, for example. Thus, low-latency feedback for the transmitted data may be achieved for the traffic of the UE #1.

In addition, the base station 110 sets a relatively short symbol length for the traffic of the UE #1 for which low-latency feedback for transmitted data is requested on a priority basis. Thus, encoding and decoding may be executed on the traffic of the UE #1 at short time intervals, and a delay amount may be reduced for the traffic of the UE #1.

In the example illustrated in FIG. 2, in each of the subframes 221 to 223 for the traffic of the UE #1, the DL is allocated to the top twelve symbols, guard time is allocated to the next symbol, and the UL is allocated to a single remaining symbol. Guard time is a protection time period between the DL and the UL. In addition, in the subframe 224 for the traffic of the UE #1, the UL is allocated to the top twelve symbols and the DL is allocated to remaining two symbols.

In addition, the base station 110 uses a narrow-band signal with a long symbol length for the traffic of the UEs #2 to #4 and sets a long TTI length for the traffic of the UEs #2 to #4 for which wide coverage and low consumption power are requested on a priority basis without applying the self-contained subframe. Specifically, only any of the DL and the UL is allocated to the UEs #2 to #4 in a single subframe.

In the subframes 221 to 223, muting time periods are set for the UEs #2 to #4 during time periods during which the UL is allocated to the UE #1. The muting time periods are time periods during which a radio signal is not transmitted and received. In addition, in the subframe 224, muting time periods are set for the UEs #2 to #4 during a time period during which the DL is allocated to the UE #1.

In the example illustrated in FIG. 2, in each of the subframes 221 to 223 for the traffic of the UE #2, the DL is allocated to the top three symbols and muting is allocated to a remaining time period. In addition, in the subframe 224 for the traffic of the UE #2, the UL is allocated to the top three symbols and muting is allocated to a remaining time period. The time periods for the muting may be set to be shorter than a symbol length of an OFDM signal used by the UE #2.

In each of the subframes 221 to 223 for the UEs #3 and #4, the DL is allocated to the top one symbol and muting is allocated to a remaining time period. In addition, in the subframe 224 for the traffic of the UEs #3 and #4, the UL is allocated to the top one symbol and muting is allocated to a remaining time period. The time periods for the muting may be set to be shorter than symbol lengths of OFDM signals used by the UEs #3 and #4.

As illustrated in FIG. 2, first time periods 231 to 234 and second time periods 241 to 244 are set in the subframes 221 to 224. Each of the first time periods 231 to 234 is a time period during which the UEs #1 to #4 (first terminal 121 and second terminal 122) execute radio transmission in either one of the DL and the UL in the same direction. For example, during the first time periods 231 to 233, the UEs #1 to #4 execute radio transmission in the DL. In addition, during the first time period 234, the UEs #1 to #4 execute radio transmission in the UL.

Each of the second time periods 241 to 244 is a time period during which the UE #1 (first terminal 121) may execute radio transmission in a link in a direction opposite to each of the first time periods 231 to 234. For example, during the second time periods 241 to 243, the UE #1 executes radio transmission in the UL. In addition, during the second time period 244, the UE #1 executes radio transmission in the DL.

During the second time periods 241 to 244, the UEs #2 to #4 (second terminal 122) are in a muting state in which the UEs #2 to #4 do not execute radio transmission between the UEs #2 to #4 and the base station 110. For example, the UEs #2 to #4 do not execute radio transmission between the UEs #2 to #4 and the base station 110 in the UL and the DL during the second time periods 241 to 243 during which the UE #1 executes radio transmission in the UL. In addition, the UEs #2 to #4 do not execute radio transmission between the UEs #2 to #4 and the base station 110 in the UL and the DL during the second time period 244 during which the UE #1 executes radio transmission in the DL. In the example illustrated in FIG. 2, the guard time is set for the UE #1, but the UEs #2 to #4 are in a muting state in which the UEs #2 to #4 do not execute radio transmission between the UEs #2 to #4 and the base station 110 during the guard time of the UE #1.

As illustrated in FIG. 2, if OFDM signals of the UEs #1 to #4 include OFDM signals with different symbol lengths, the OFDM signals are not orthogonal to each other. Thus, in this case, a low sidelobe modulation scheme such as FBMC or F-OFDM may be used to separate the OFDM signals of the UEs #1 to #4 by filtering. Thus, even if the OFDM signals of the UEs #1 to #4 are not orthogonal to each other, the OFDM signals of the UEs #1 to #4 may be separated on a receiving side. FBMC stands for Filter Bank Multi-Carrier. F-OFDM stands for Filtered-OFDM.

In this manner, the UE #1 (first terminal 121) executes radio transmission between the UE #1 and the base station 110 in the UL or the DL during each of the first time periods 231 to 234 of the subframes (predetermined time intervals). In addition, during each of the second time periods 241 to 244, the UE #1 executes radio transmission between the UE #1 and the base station 110 in a link in a direction opposite to each of the first time periods 231 to 234. For example, the UE #1 executes radio transmission in the DL during the first time period 231 and executes radio transmission in the UL in the opposite direction to the DL during the second time period 241.

In addition, the UEs #2 to #4 (second terminal 122) execute radio transmission between the UEs #2 to #4 and the base station 110 in a link in the same direction as the UE #1 during each of the first time periods 231 to 234 of the subframes and do not execute radio transmission between the UEs #2 to #4 and the base station 110 during the second time periods 241 to 244. For example, the UEs #2 to #4 execute radio transmission in the DL in the same direction as the UE #1 during the first time period 231 and do not execute radio transmission in the DL and radio transmission in the UL during the second time period 241.

Thus, the communication of the UE #1 that executes radio transmission in the UL and the DL in each of the subframes causes lower latency than the communication of the UEs #2 to #4 that execute radio transmission in any of the UL and DL in each of the subframes. It is, therefore, possible to frequency-multiplex communication (communication of the UE #1) in which a delay amount is relatively small and communication (communication of the UEs #2 to #4) in which a delay amount is relatively large. In the example illustrated in FIG. 2, each of TTIs of the UE #1 is equal to a 1 subframe, while each of TTIs of the UEs #2 to #4 is equal to 4 subframes.

In addition, each of the UEs #2 to #4 executes radio transmission between the UE and the base station 110 by using an OFDM signal of a second symbol length (subcarrier spacing=1 or 3) longer than a first symbol length (subcarrier spacing=12) of an OFDM signal of the UE #1. Thus, the communication of the UEs #2 to #4 may cause wider coverage than the communication of the UE #1 and lower consumption power than the communication of the UE #1. It is, therefore, possible to frequency-multiplex communication (communication of the UE #1) in which a delay amount is small and communication (communication of the UEs #2 to #4) that causes wide coverage and low consumption power.

In addition, since the UEs #2 to #4 do not execute radio transmission between the UEs #2 to #4 and the base station 110 during the second time periods 241 to 244, the lengths of the second time periods 241 to 244 may be set to be shorter than symbol lengths of OFDM signals of the UEs #2 to #4. Thus, the time periods for the DL and the time periods for the UL may be set in units of a length shorter than the symbol lengths of the OFDM signals of the UEs #2 to #4. This may increase the degree of freedom of scheduling by the base station 110 in the case where multiple types of traffic with different symbol lengths are frequency-multiplexed and may improve the efficiency of using radio resources.

For example, like the example illustrated in FIG. 2, radio resources to be used for the UE #1 to receive data in the DL in the subframes 221 to 223 may be increased and radio resources to be used for the UE #1 to transmit a response signal to data in the UL in the subframes 221 to 223 may be reduced. In addition, radio resources to be used for the UE #1 to transmit data in the UL in the subframe 224 may be increased and radio resources to be used for the UE #1 to receive a response signal to data in the DL in the subframe 224 may be reduced.

In addition, in a configuration in which communication in which symbol lengths are different is frequency-multiplexed, signals in the communication may be separated on a receiving side by using the low sidelobe modulation scheme such as FBMC or F-OFDM, for example.

The base station 110 determines a frame configuration illustrated in FIG. 2 in the scheduling. The frame configuration includes lengths (division ratio of one subframe) of the first time periods 231 to 234 and second time periods 241 to 244 and the like. For example, if traffic of a type for which low latency is requested and traffic for which wide coverage and low consumption power are requested exist among traffic of the base station 110, the base station 110 selects the frame configuration illustrated in FIG. 2.

The types of traffic may be determined based on device types of the UEs corresponding to the traffic and communication requests from the UEs for the traffic, for example. In addition, the base station 110 determines subcarrier spacings to be set for the traffic, the numbers of subcarriers, TTIs, CP lengths, and the like based on transmission rates requested for the traffic and the like.

Figure 3:
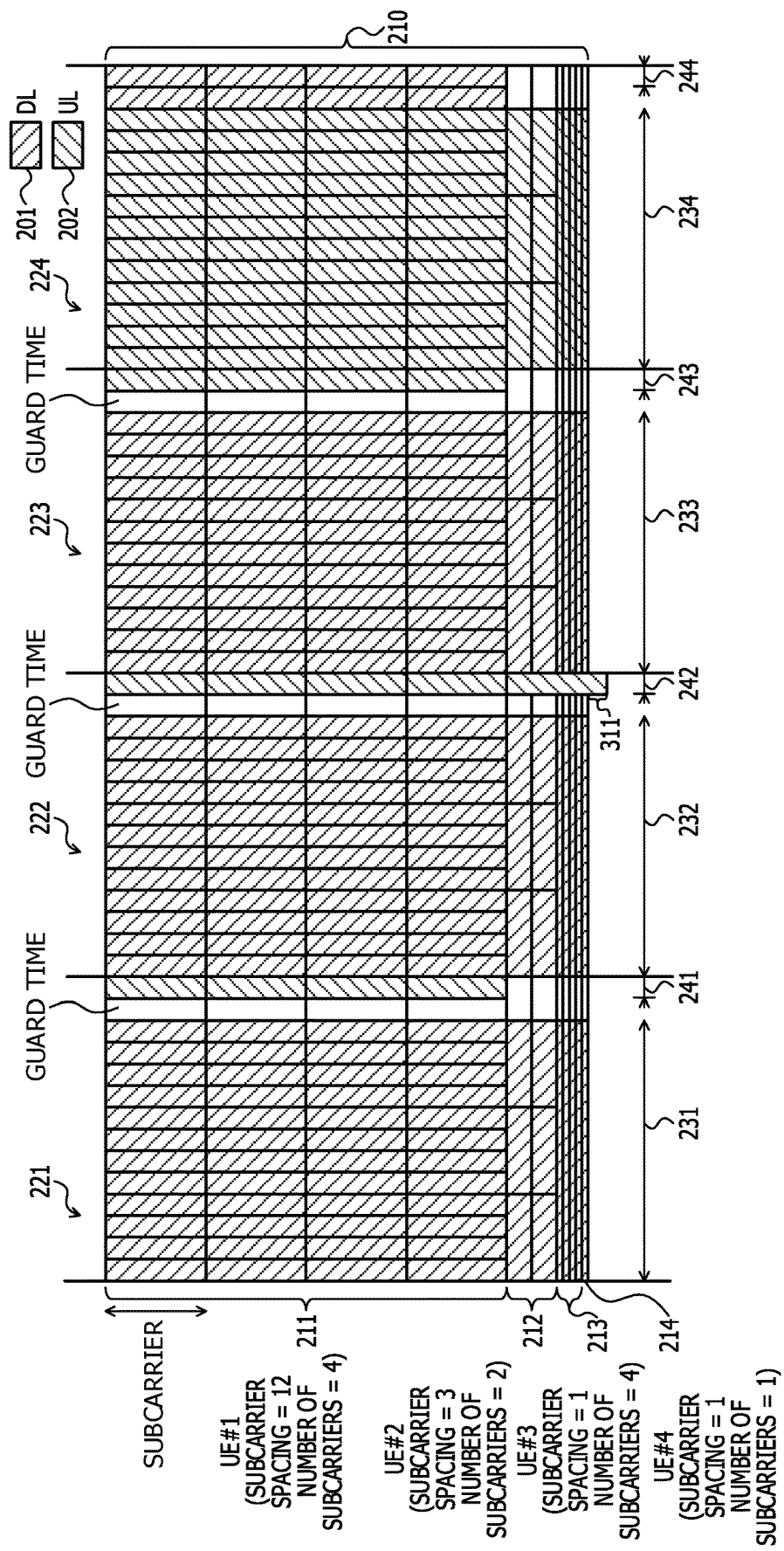
FIG. 3 illustrates another example of the scheduling in the communication system according to the first embodiment.

FIG. 3 illustrates another example of the scheduling in the communication system according to the first embodiment. In FIG. 3, sections that are the same as or similar to the sections illustrated in FIG. 2 are indicated by the same reference symbols as those illustrated in FIG. 2, and a description thereof is omitted. As illustrated in FIG. 3, the base station 110 may allocate the frequency band 211 and at least any of the frequency bands 212 to 214 to the UE #1 for at least any of the second time periods 241 to 244.

Specifically, the base station 110 may allocate the frequency bands 212 to 214 to the UE #1 for the second time periods 241 to 244 that are not used by the UEs #2 to #4. In the example illustrated in FIG. 3, the base station 110 allocates the frequency bands 211 to 214 and a frequency band 311 to the UE #1 for the second time period 242. In the example illustrated in FIG. 3, since only the frequency bands 211 to 214 do not reach the subcarrier spacing (12) of the UE #1, the frequency bands 211 to 214 and the frequency band 311 are allocated to the UE #1. The UE #1 executes radio transmission in the UL using the frequency bands 211 to 214 and 311 during the second time period 242 based on results of the scheduling by the base station 110.

As illustrated in FIG. 3, the UE #1 (first terminal 121) may execute radio transmission by using the frequency band 211 (first frequency band) and the frequency bands 212 to 214 (second frequency bands) during at least any of the second time periods 241 to 244 of the subframes. Thus, the efficiency of using radio resources may be improved.

<Base Station According to First Embodiment>

Figure 4:
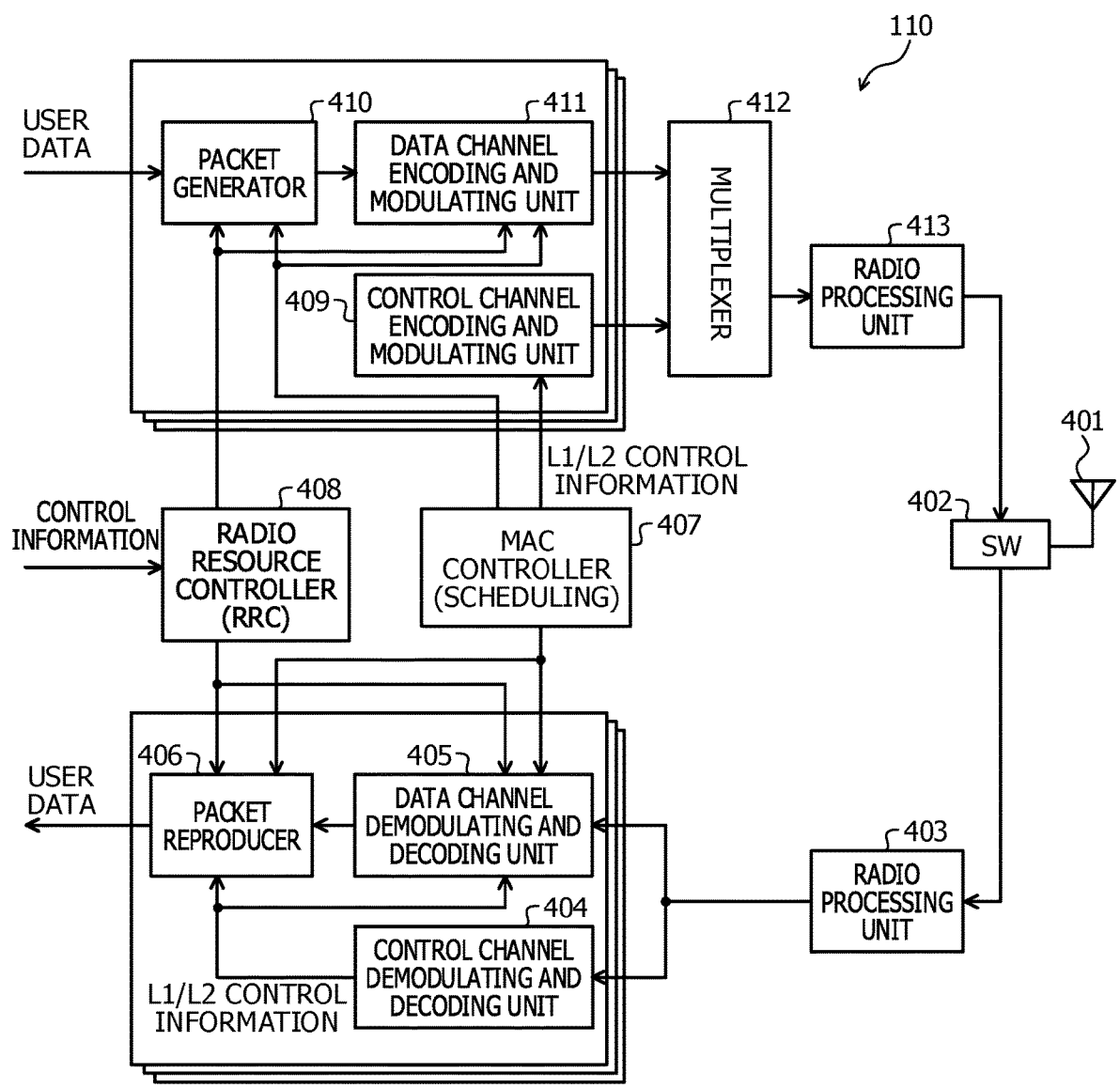
FIG. 4 illustrates an example of a base station according to the first embodiment.

FIG. 4 illustrates an example of the base station according to the first embodiment. As illustrated in FIG. 4, for example, the base station 110 according to the first embodiment includes an antenna 401, a switch 402 (SW), a radio processing unit 403, control channel demodulating and decoding units 404, data channel demodulating and decoding units 405, and packet reproducers 406. The base station 110 also includes a MAC controller 407, a radio resource controller 408, control channel encoding and modulating units 409, packet generators 410, data channel encoding and modulating units 411, a multiplexer 412, and a radio processing unit 413.

The antenna 401, the switch 402, and the radio processing units 403 and 413 are a communication unit that executes radio transmission between the communication unit and the first and second terminals 121 and 122 illustrated in FIG. 1. The communication unit may include the control channel demodulating and decoding units 404, the data channel demodulating and decoding units 405, the packet reproducers 406, the control channel encoding and modulating units 409, the packet generators 410, the data channel encoding and modulating units 411, and the multiplexer 412.

The antenna 401 receives a signal wirelessly transmitted by another communication device (for example, first terminal 121 or second terminal 122) and outputs the signal to the switch 402. In addition, the antenna 401 wirelessly transmit a signal output from the switch 402 to another communication device (for example, first terminal 121 or second terminal 122).

The switch 402 switches between transmission and reception in the base station 110. For example, the switch 402 outputs the signal output from the antenna 401 to the radio processing unit 403. In addition, the switch 402 outputs a signal output from the radio processing unit 413 to the antenna 401.

The radio processing unit 403 executes an RF reception process on the signal output from the switch 402. The RF reception process by the radio processing unit 403 includes amplification, frequency conversion from an RF (radio frequency) band to a baseband, conversion from an analog signal to a digital signal, and the like, for example. The radio processing unit 403 outputs the signal subjected to the RF reception process to the control channel demodulating and decoding units 404 and the data channel demodulating and decoding units 405.

The control channel demodulating and decoding units 404, the data channel demodulating and decoding units 405, and the packet reproducers 406 are set for terminals that are communication destinations of the base station 110, for example. The example illustrated in FIG. 4 assumes that the base station 110 executes radio communication with three terminals. Thus, the three control channel demodulating and decoding units 404, the three data channel demodulating and decoding units 405, and the three packet reproducers 406 are set.

The control channel demodulating and decoding units 404 demodulate and decode a control channel included in the signal output from the radio processing unit 403. An example of the control channel demodulated and decoded by the control channel demodulating and decoding units 404 is PUCCH (Physical Uplink Control Channel). The control channel demodulating and decoding units 404 output L1 and L2 control information (L1/L2 control information) obtained by the demodulation and the decoding to the data channel demodulating and decoding units 405 and the packet reproducers 406.

The data channel demodulating and decoding units 405 demodulate and decode a data channel included in the signal output from the radio processing unit 403. An example of the data channel demodulated and decoded by the data channel demodulating and decoding units 405 is PUSCH (Physical Uplink Shared Channel). The data channel demodulating and decoding units 405 output data obtained by the demodulation and the decoding to the packet reproducers 406. In addition, the data channel demodulating and decoding units 405 demodulate and decode the data channel in accordance with control by the MAC controller 407 and the radio resource controller 408.

The packet reproducers 406 reproduce packets from the data output from the data channel demodulating and decoding units 405 based on the control information output from the control channel demodulating and decoding units 404. Then, the packet reproducers 406 output the reproduced packets as user data. In addition, the packet reproducers 406 reproduce the packets in accordance with control by the MAC controller 407 and the resource controller 408.

The MAC controller 407 is a controller that controls the first terminal 121 and the second terminal 122 so as to cause the first terminal 121 and the second terminal 122 to execute radio transmission between the first and second terminals 121 and 122 and the communication unit including the antenna 401, the switch 402, and the radio processing units 403 and 413 or so as to inhibit the first terminal 121 and the second terminal 122 from executing radio transmission between the first and second terminals 121 and 122 and the communication unit including the antenna 401, the switch 402, and the radio processing units 403 and 413. For example, the MAC controller 407 controls the MAC (Media Access Control) layer in communication of the radio terminal 110. The control of the MAC layer includes scheduling to be executed to allocate radio resources to radio communication between the base station 110 and the terminals (for example, first terminal 121 and second terminal 122). The scheduling to be executed by the base station 110 and illustrated in FIGS. 2 and 3 may be executed by the MAC controller 407, for example.

The MAC controller 407 controls, based on results of the scheduling of the UL, the demodulation and decoding by the data channel demodulating and decoding units 405 and the packet reproduction by the packet reproducers 406. In addition, the MAC controller 407 controls, based on results of the scheduling of the DL, encoding and modulation by the control channel encoding and modulating units 409 and the data channel encoding and modulating units 411 and packet generation by the packet generators 410. Furthermore, the MAC controller 407 outputs L1 and L2 control information indicating the results of the scheduling of the DL and the UL to the control channel encoding and modulating units 409.

The radio resource controller 408 controls the RRC (radio resource control) layer in the communication of the base station 110. For example, the radio resource controller 408 controls the demodulation and decoding by the data channel demodulating and decoding units 405 and the packet reproduction by the packet reproducers 406. In addition, the radio resource controller 408 controls the packet generation by the packet generators 410 and the encoding and modulation by the data channel encoding and modulating units 411. Furthermore, the radio resource controller 408 executes the control based on control information received from a core network, for example.

The control channel encoding and modulating units 409, the packet generators 410, and the data channel encoding and modulating units 411 are set for the terminals that are the communication destinations of the base station 110, for example. The example illustrated in FIG. 4 assumes that the base station 110 executes radio communication with the three terminals. Thus, the three control channel encoding and modulating units 409, the three packet generators 410, and the three data channel encoding and modulating units 411 are set.

The control channel encoding and modulating units 409 encode and modulate a control channel including the control information output from the MAC controller 407. An example of the control channel encoded and modulated by the control channel encoding and modulating units 409 is PDCCH (Physical Downlink Control Channel). The control channel encoding and modulating units 409 output the control channel obtained by the encoding and the modulation to the multiplexer 412. In addition, the control channel encoding and modulating units 409 encode and modulate the control channel in accordance with control by the MAC controller 407.

The packet generators 410 generate packets from DL user data to be transmitted by the base station 110 and outputs the generated packets to the data channel encoding and modulating units 411. In addition, the packet generators 410 generate the packets in accordance with the control by the MAC controller 407 and the radio resource controller 408.

The data channel encoding and modulating units 411 encode and modulate a data channel including the packets output from the packet generators 410. An example of the data channel encoded and modulated by the data channel encoding and modulating unit 411 is PDSCH (Physical Downlink Shared Channel). The data channel encoding and modulating units 411 output the data channel obtained by the encoding and the modulation to the multiplexer 412. In addition, the data channel encoding and modulating units 411 encode and modulate the data channel in accordance with control by the MAC controller 407 and the radio resource controller 408.

The multiplexer 412 multiplexes the control channel output from the control channel encoding and modulating units 409 with the data channel output from the data channel encoding and modulating units 411. Then, the multiplexer 412 outputs a signal obtained by the multiplexing to the radio processing unit 413.

The radio processing unit 413 executes an RF transmission process on the signal output from the multiplexer 412. The RF transmission process by the radio processing unit 413 includes conversion from a digital signal to an analog signal, frequency conversion from a baseband to an RF band, amplification, and the like, for example. The radio processing unit 413 outputs the signal subjected to the RF transmission process to the switch 402.

Figure 5:
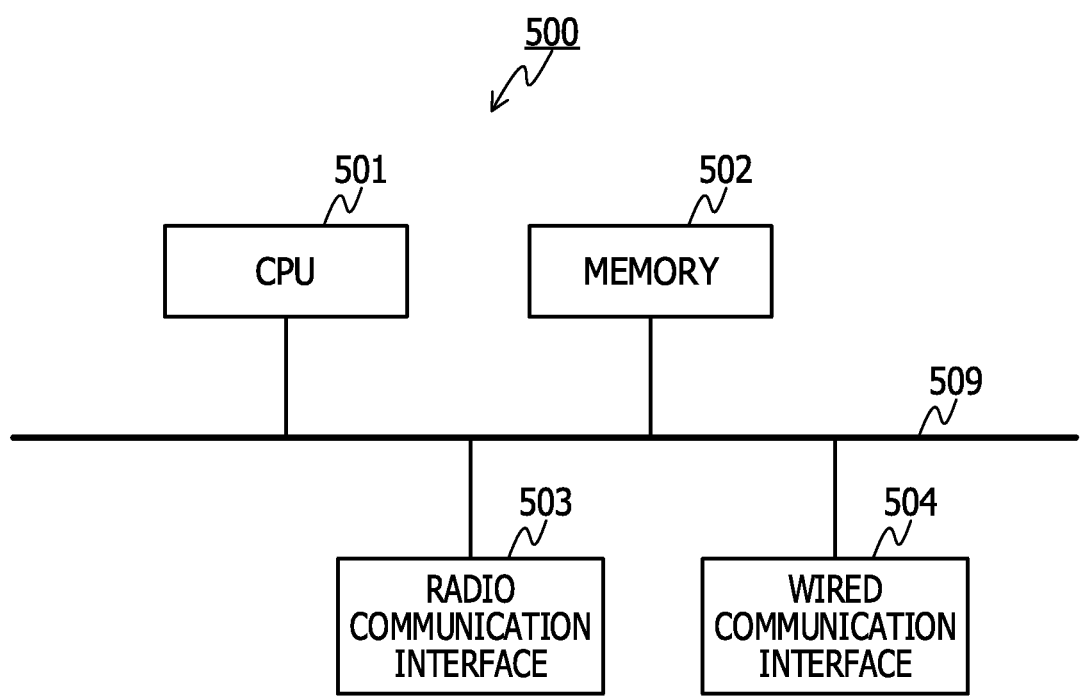
FIG. 5 illustrates an example of a hardware configuration of the base station according to the first embodiment.

FIG. 5 illustrates an example of a hardware configuration of the base station according to the first embodiment. The base station 110 illustrated in FIG. 4 may be achieved by a communication device 500 illustrated in FIG. 5, for example. The communication device 500 includes a CPU 501, a memory 502, a radio communication interface 503, and a wired communication interface 504. The CPU 501, the memory 502, the radio communication interface 503, and the wired communication interface 504 are connected to each other via a bus 509.

The CPU 501 (central processing unit) controls the entire communication device 500. The memory 502 includes a main memory and an auxiliary memory. The main memory is, for example, a RAM (random access memory). The main memory is used as a work area of the CPU 501. The auxiliary memory is a nonvolatile memory such as a magnetic disk, an optical disc, or a flash memory, for example. In the auxiliary memory, various programs for operating the communication device 500 are stored. The programs stored in the auxiliary memory are loaded into the main memory and executed by the CPU 501.

The radio communication interface 503 is a communication interface that wirelessly communicates with externals (for example, first terminal 121 and second terminal 122) of the communication device 500. The radio communication interface 503 is controlled by the CPU 501. The radio communication interface 503 includes an ADC (analog/digital converter), a DAC (digital/analog converter), and the like, for example. The radio communication interface 503 also includes an amplifier, a mixer that executes frequency conversion, and the like.

The wired communication interface 504 is a communication interface that communicates with externals of the communication device 500 via cables. The wired communication interface 504 is controlled by the CPU 501. The communication destinations (externals) of the wired communication interface 504 are communication devices of the core network connected to the base station 110, for example.

The antenna 401, the switch 402, and the radio processing units 403 and 413 that are illustrated in FIG. 4 are included in the radio communication interface 503, for example. The control channel demodulating and decoding units 404, the data channel demodulating and decoding units 405, the packet reproducers 406, the MAC controller 407, and the radio resource controller 408 that are illustrated in FIG. 4 may be achieved by the CPU 501, for example. The control channel encoding and modulating units 409, the packet generators 410, the data channel encoding and modulating units 411, and the multiplexer 412 that are illustrated in FIG. 4 may be achieved by the CPU 501, for example.

In addition, the user data output from the packet reproducers 406 illustrated in FIG. 4 is transmitted to the core network via the wired communication interface 504. In addition, the control information transmitted from the core network is input to the wireless resource controller 408 illustrated in FIG. 4 via the wired communication interface 504. In addition, user data transmitted from the core network is input to the packet generators 410 illustrated in FIG. 4 via the wired communication interface 504.

<Terminals According to First Embodiment>

Figure 6:
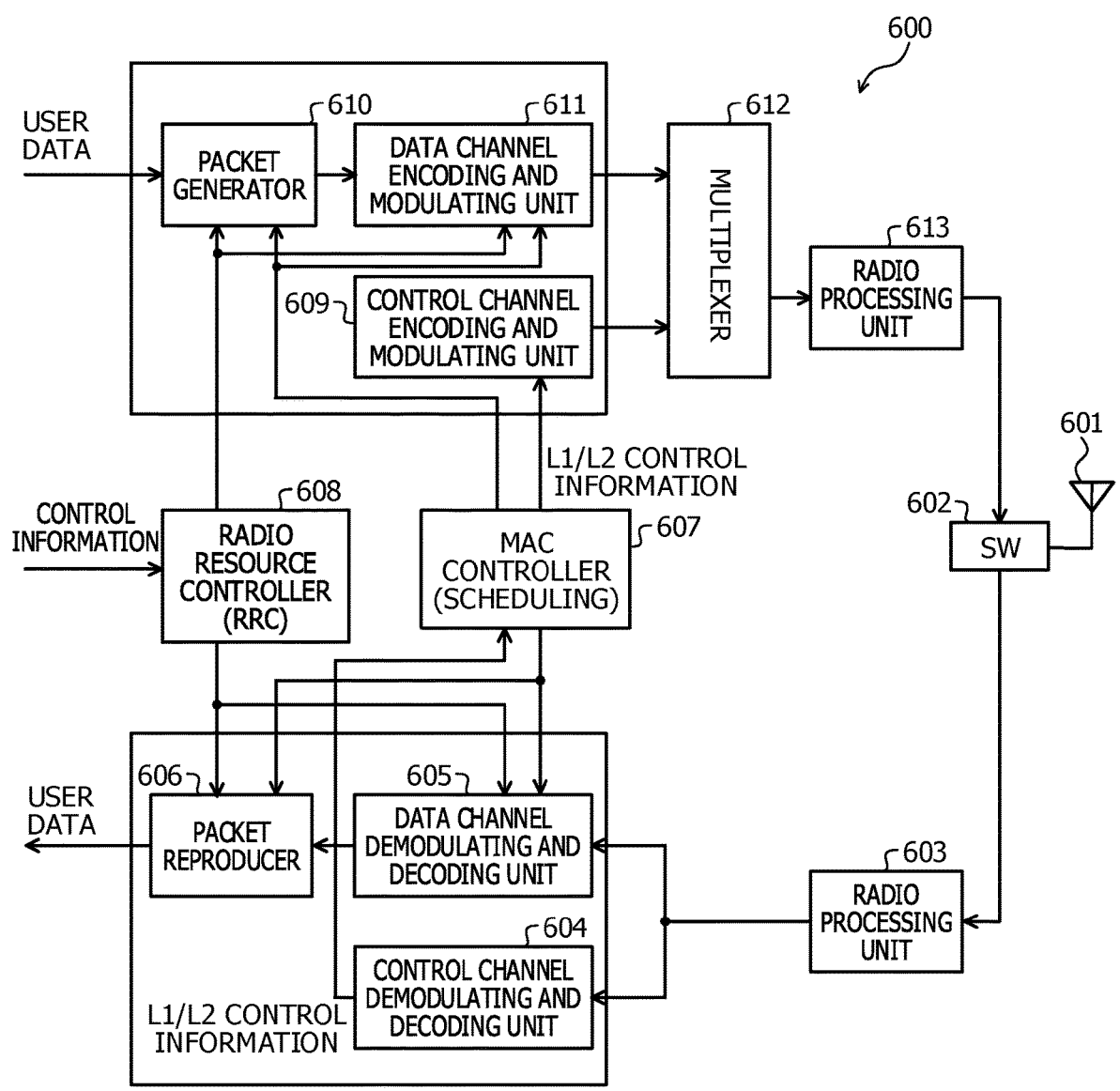
FIG. 6 illustrates an example of a terminal according to the first embodiment.

FIG. 6 illustrates an example of a terminal according to the first embodiment. Each of the first and second terminals 121 and 122 according to the first embodiment may be achieved by a terminal illustrated in FIG. 6, for example. The terminal 600 includes an antenna 601, a switch 602, a radio processing unit 603, a control channel demodulating and decoding unit 604, a data channel demodulating and decoding unit 605, and a packet reproducer 606. The terminal 600 also includes a MAC controller 607, a radio resource controller 608, a control channel encoding and modulating unit 609, a packet generator 610, a data channel encoding and modulating unit 611, a multiplexer 612, and a radio processing unit 613.

The antenna 601 receives a signal wirelessly transmitted by another communication device (for example, base station 110) and outputs the signal to the switch 602. In addition, the antenna 601 wirelessly transmits a signal output from the switch 602 to another communication device (for example, base station 110).

The switch 602 switches between transmission and reception in the terminal 600. For example, the switch 602 outputs the signal output from the antenna 601 to the radio processing unit 603. In addition, the switch 602 outputs a signal output from the radio processing unit 613 to the antenna 601.

The radio processing unit 603 executes an RF reception process on the signal output from the switch 602. The RF reception process by the radio processing unit 603 includes amplification, frequency conversion from an RF band to a baseband, conversion from an analog signal to a digital signal, and the like, for example. The radio processing unit 603 outputs the signal subjected to the RF reception process to the control channel demodulating and decoding unit 604 and the data channel demodulating and decoding unit 605.

The control channel demodulating and decoding unit 604 demodulates and decodes a control channel included in the signal output from the radio processing unit 603. An example of the control channel demodulated and decoded by the control channel demodulating and decoding unit 604 is PDCCH. The control channel demodulating and decoding unit 604 outputs L1 and L2 control information (L1/L2 control information) obtained by the demodulation and the decoding to the MAC controller 607. The control information output from the control channel demodulating and decoding unit 604 to the MAC controller 607 includes results of the scheduling of the DL and the UL by the base station 110.

The data channel demodulating and decoding unit 605 demodulates and decodes a data channel included in the signal output from the radio processing unit 603. An example of the data channel demodulated and decoded by the data channel demodulating and decoding unit 605 is PDSCH. The data channel demodulating and decoding unit 605 outputs data obtained by the demodulation and the decoding to the packet reproducer 606. In addition, the data channel demodulating and decoding unit 605 demodulates and decodes the data channel in accordance with control by the MAC controller 607 and the radio resource controller 608.

The packet reproducer 606 reproduces a packet from the data output from the data channel demodulating and decoding unit 605. Then, the packet reproducer 606 outputs the packet as user data. In addition, the packet reproducer 606 reproduces the packet in accordance with control by the MAC controller 607 and the radio resource controller 608.

The MAC controller 607 controls the MAC layer in the communication of the terminal 600 based on the control information (for example, the results of the scheduling) output from the control channel demodulating and decoding unit 604. For example, the MAC controller 607 controls, based on the results of the scheduling of the DL by the base station 110, the demodulation and decoding by the data channel demodulating and decoding unit 605 and the packet reproduction by the packet reproducer 606. In addition, the MAC controller 607 controls, based on the results of the scheduling of the UL by the base station 110, encoding and modulation by the control channel encoding and modulating unit 609 and packet generation by the packet generator 610. In addition, the MAC controller 607 outputs L1 and L2 uplink control information to the control channel encoding and modulating unit 609.

The radio resource controller 608 controls the RRC layer in the communication of the terminal 600. For example, the radio resource controller 608 controls the demodulation and decoding by the data channel demodulating and decoding unit 605 and the packet reproduction by the packet reproducer 606. In addition, the radio resource controller 608 controls the packet generation by the packet generator 610 and encoding and modulation by the data channel encoding and modulating unit 611. In addition, the radio resource controller 608 executes the control based on control information output from an upper-level layer (for example, application processing unit), for example.

The control channel encoding and modulating unit 609 encodes and modulates a control channel including the control information output from the MAC controller 607. An example of the control channel encoded and modulated by the control channel encoding and modulating unit 609 is PUCCH. The control channel encoding and modulating unit 609 outputs the control channel obtained by the encoding and the modulation to the multiplexer 612. In addition, the control channel encoding and modulating unit 609 encodes and modulates the control channel in accordance with control by the MAC controller 607.

The packet generator 610 generates a packet from UL user data to be transmitted by the terminal 600 and outputs the generated packet to the data channel encoding and modulating unit 611. In addition, the packet generator 610 generates the packet in accordance with control by the MAC controller 607 and the radio resource controller 608.

The data channel encoding and modulating unit 611 encodes and modulates a data channel including the packet output from the packet generator 610. An example of the data channel encoded and modulated by the data channel encoding and modulating unit 611 is PUSCH. The data channel encoding and modulating unit 611 outputs the data channel obtained by the encoding and the modulation to the multiplexer 612. In addition, the data channel encoding and modulating unit 611 executes the encoding and the modulation in accordance with control by the MAC controller 607 and the radio resource controller 608.

The multiplexer 612 multiplexes the control channel output from the control channel encoding and modulating unit 609 with the data channel output from the data channel encoding and modulating unit 611. Then, the multiplexer 612 outputs a signal obtained by the multiplexing to the radio processing unit 613.

The radio processing unit 613 executes an RF transmission process on the signal output from the multiplexer 612. The RF transmission process by the radio processing unit 613 includes conversion from a digital signal to an analog signal, frequency conversion from a baseband to an RF band, amplification, and the like. The radio processing unit 613 outputs the signal subjected to the RF transmission process to the switch 602.

Figure 7:
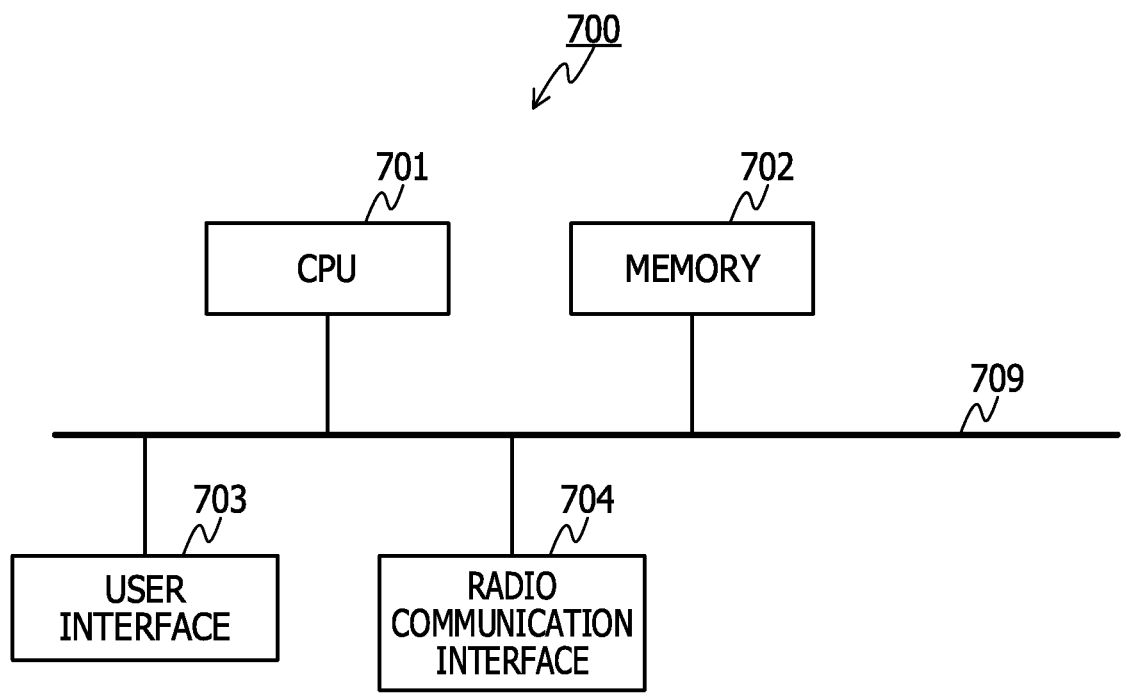
FIG. 7 illustrates an example of a hardware configuration of the terminal according to the first embodiment.

FIG. 7 illustrates an example of a hardware configuration of the terminal according to the first embodiment. The terminal 600 illustrated in FIG. 6 may be achieved by an information processing device 700 illustrated in FIG. 7, for example. The information processing device 700 includes a CPU 701, a memory 702, a user interface 703, and a radio communication interface 704. The CPU 701, the memory 702, the user interface 703, and the radio communication interface 704 are connected to each other via a bus 709.

The CPU 701 controls the entire information processing device 700. The memory 702 includes a main memory and an auxiliary memory, for example. The main memory is, for example, a RAM. The main memory is used as a work area of the CPU 701. The auxiliary memory is a nonvolatile memory such as a magnetic disk or a flash memory. In the auxiliary memory, various programs for operating the information processing device 700 are stored. The programs stored in the auxiliary memory are loaded into the main memory and executed by the CPU 701.

The user interface 703 includes an input device for receiving an input operation from a user and an output device for outputting information to the user. The input device may be achieved by keys (for example, a keyboard), a remote controller, or the like. The output device may be achieved by a display, a speaker, or the like. Alternatively, the input device and the output device may be achieved by a touch panel or the like. The user interface 703 is controlled by the CPU 701.

The radio communication interface 704 is a communication interface that wirelessly communicates with an external (for example, the base station 110) of the information processing device 700. The radio communication interface 704 is controlled by the CPU 701.

The antenna 601, the switch 602, and the radio processing units 603 and 613 that are illustrated in FIG. 6 are included in the radio communication interface 704, for example. The control channel demodulating and decoding unit 604, the data channel demodulating and decoding unit 605, the packet reproducer 606, the MAC controller 607, and the radio resource controller 608 that are illustrated in FIG. 6 may be achieved by the CPU 701, for example. The control channel encoding and modulating unit 609, the packet generator 610, the data channel encoding and modulating unit 611, and the multiplexer 612 that are illustrated in FIG. 6 may be achieved by the CPU 701, for example.

In addition, the user data output from the packet reproducer 606 illustrated in FIG. 6 is processed by an application executed by the CPU 701, for example. In addition, control information output from the application executed by the CPU 701 is input to the radio resource controller 608 illustrated in FIG. 6. In addition, user data output from the application executed by the CPU 701 is input to the packet generator 610 illustrated in FIG. 6.

In this manner, the first terminal 121 according to the first embodiment executes radio transmission between the first terminal 121 and the base station 110 in the UL or the DL during a first time period of each of the predetermined time intervals (subframes). In addition, during a second time period of each of the predetermined time intervals, the first terminal 121 executes radio transmission between the first terminal 121 and the base station 110 in a link in a direction opposite to a first time period. In addition, the second terminal 122 executes radio transmission between the second terminal 122 and the base station 110 in a link in the same direction as the first terminal 121 during a first time period of each of the predetermined time intervals and does not execute radio transmission between the second terminal 122 and the base station 110 during the second time periods.

Thus, the transmission of data and the transmission of a response signal to the data in the communication of the first terminal 121 that executes radio transmission in the UL and the DL in each of the predetermined time intervals may be executed at shorter time intervals than those in the communication of the second terminal 122 that executes radio transmission in either one of the UL and the DL in each of the predetermined time intervals. Thus, the communication of the first terminal 121 causes lower latency than the communication of the second terminal 122. It is, therefore, possible to frequency-multiplex the communication (communication of the first terminal 121) in which a delay amount is small and the communication (communication of the second terminal 122) in which a delay amount is large.

In addition, the second terminal 122 executes radio transmission between the second terminal 122 and the base station 110 by using an OFDM signal with a second symbol length longer than a first symbol length of an OFDM signal of the first terminal 121. Coverage and consumption power for the communication of the second terminal 122, therefore, may be wider and lower than coverage and consumption power for the communication of the first terminal 121. It is, therefore, possible to frequency-multiplex the communication (communication of the first terminal 121) in which a delay amount is small and the communication (communication of the second terminal 122) that achieves wide coverage and low consumption power.

In addition, since the second terminal 122 does not execute radio transmission between the second terminal 122 and the base station 110 during the second time periods, the lengths of the second time periods may be longer than the symbol length of the OFDM signal of the second terminal 122. This may increase the degree of freedom of the scheduling by the base station 110 and improve the efficiency of using radio resources in the case where multiple types of communication in which different symbol lengths are used are frequency-multiplexed.

In addition, even in the configuration in which the multiple types of communication in which the different symbol lengths are used are frequency-multiplexed, signals in the multiple types of communication may be separated on a receiving side by using the low sidelobe modulation scheme such as FBMC or F-OFDM, for example.

Second Embodiment

A second embodiment describes features different from the first embodiment. Although the first embodiment describes the case where the symbol lengths of the OFDM signals of the first and second terminals 121 and 122 are different, the second embodiment describes the case where symbol lengths of OFDM signals of the first and second terminals 121 and 122 are equal to each other.

<Scheduling in Communication System According to Second Embodiment>

Figure 8:
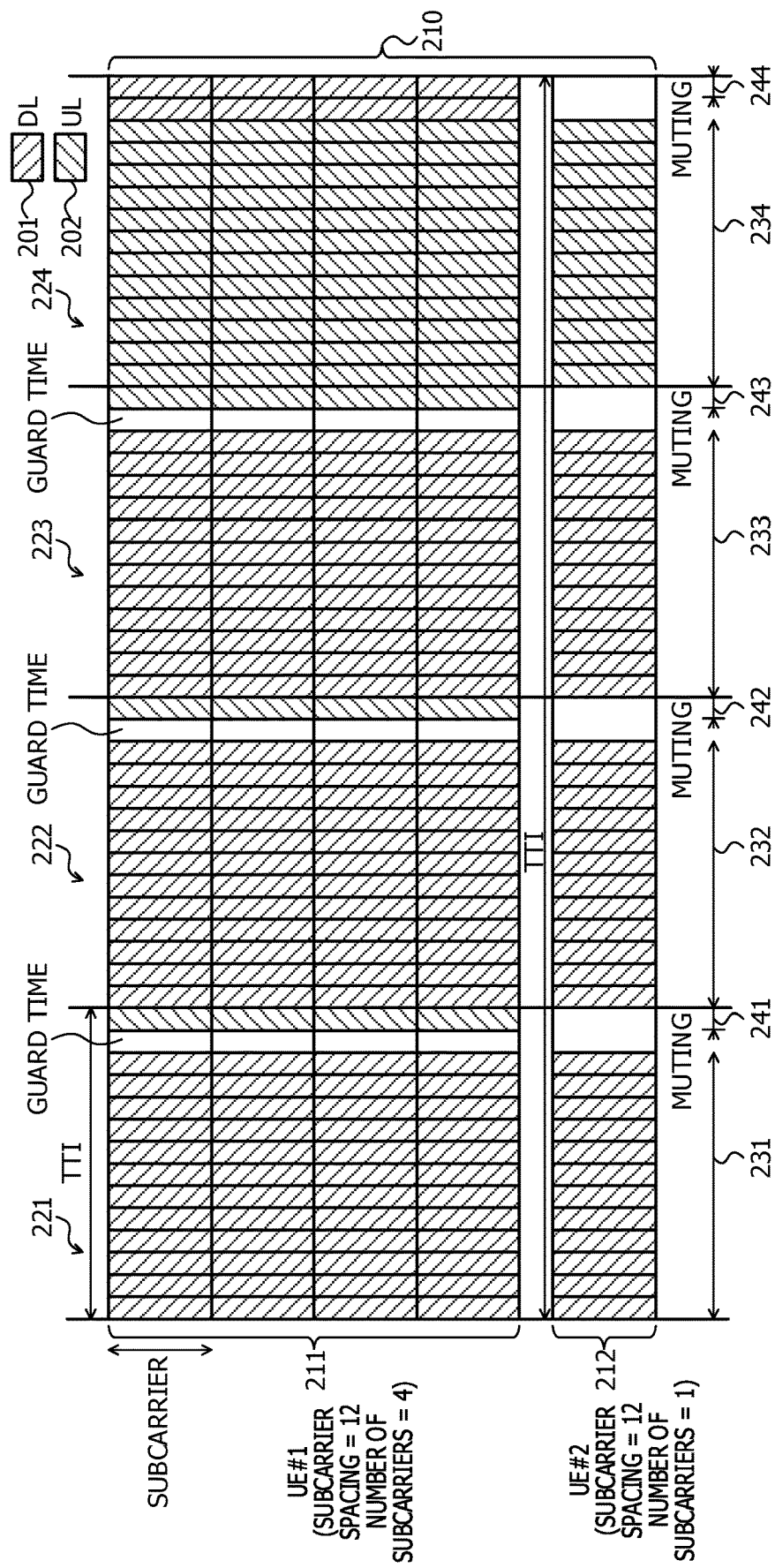
FIG. 8 illustrates an example of scheduling in a communication system according to a second embodiment.

FIG. 8 illustrates an example of scheduling in a communication system according to the second embodiment. In FIG. 8, sections that are the same as or similar to those illustrated in FIG. 2 are indicated by the same reference symbols as those illustrated in FIG. 2, and a description thereof is omitted. In the example illustrated in FIG. 8, a frequency band 211 in which a subcarrier spacing is 12 and the number of subcarriers is 4 is allocated to the UE #1. A frequency band 212 in which a subcarrier spacing is 12 and the number of subcarriers is 1 is allocated to the UE #2.

Specifically, the subcarrier spacings of 12 are set for the UEs #1 and #2, and accordingly symbol lengths of OFDM signals of the UEs #1 and #2 are equal to each other. In this case, the base station 110 may set TTIs different for the UEs #1 and #2 and frequency-multiplex multiple types of communication in which delay amounts are different.

In the example illustrated in FIG. 8, in each of the subframes 221 to 223 for traffic of the UE #1, the DL is allocated to the top twelve symbols, guard time is allocated to the next symbol, and the UL is allocated to a single remaining symbol. In addition, in the subframe 224 for the traffic of the UE #1, the UL is allocated to the top twelve symbols, and the DL is allocated to remaining two symbols.

In addition, in the example illustrated in FIG. 8, in each of the subframes 221 to 223 for traffic of the UE #2, the DL is allocated to the top twelve symbols and muting is allocated to a remaining time period. In addition, in the subframe 224 for the traffic of the UE #2, the UL is allocated to the top twelve symbols and muting is allocated to a remaining time period. The time periods for the muting may be set to be shorter than the symbol length of an OFDM signal used by the UE #2.

As illustrated in FIG. 8, in the case where the symbol lengths of the OFDM signals of the UEs #1 and #2 are equal to each other, these OFDM signals are orthogonal to each other. Thus, in this case, the OFDM signals of the UEs #1 and #2 may be separated on a receiving side without the use of the low sidelobe modulation scheme such as FBMC or F-OFDM.

In the aforementioned manner, the UE #1 (first terminal 121) executes radio transmission between the UE #1 and the base station 110 in the UL or the DL during each of the first time periods 231 to 234 of the subframes (predetermined time intervals). In addition, the UE #1 executes, during each of the second time periods 241 to 244 of the subframes, radio transmission between the UE #1 and the base station 110 in a link in a direction opposite to each of the first time periods 231 to 234. In addition, the UE #2 (second terminal 122) executes radio transmission between the UE #2 and the base station 110 in a link in the same direction as the UE #1 during each of the first time periods 231 to 234 of the subframes and does not execute radio transmission between the UE #2 and the base station 110 during the second time periods 241 to 244.

Thus, the communication of the UE #1 that executes radio transmission in the UL and the DL in each of the subframes causes lower latency than the communication of the UE #2 that executes radio transmission in either one of the UL and the DL in each of the subframes. It is, therefore, possible to frequency-multiplex the communication (communication of the UE #1) in which a delay amount is small and the communication (communication of the UE #2) in which a delay amount is large. In the example illustrated in FIG. 8, a TTI of the UE #1 is equal to 1 subframe, while a TTI of the UE #2 is equal to 4 subframes.

In addition, even in the case where the symbol lengths of the OFDM signals of the UEs #1 and #2 are equal to each other, communication rates of the UEs #1 and #2 may be changed by adjusting the numbers of subcarriers to be allocated to the UEs #1 and #2 and the numbers of symbols to be allocated to the UEs #1 and #2, for example.

Figure 9:
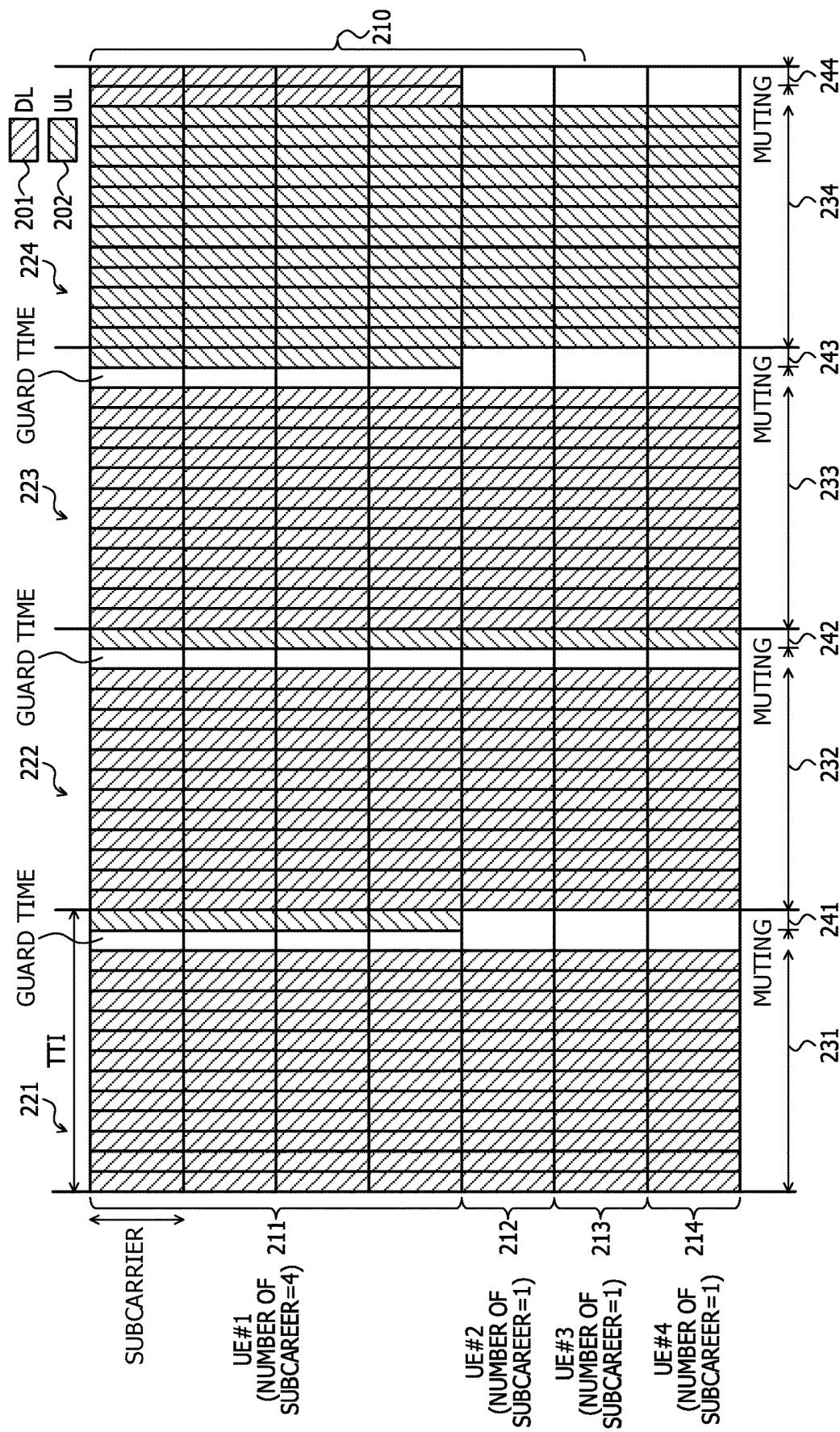
FIG. 9 illustrates another example of the scheduling in the communication system according to the second embodiment.

FIG. 9 illustrates another example of the scheduling in the communication system according to the second embodiment. In FIG. 9, sections that are the same as or similar to those illustrated in FIG. 8 are indicated by the same reference symbols as those illustrated in FIG. 8, and a description thereof is omitted. As illustrated in FIG. 9, the base station 110 may allocate the frequency band 211 and at least any of the frequency bands 212 to 214 to the UE #1 for at least any of the second time periods 241 to 244.

In the example illustrated in FIG. 9, the frequency bands 213 and 214 (the numbers of subcarriers are 1) are allocated to traffic of the UEs #3 and #4. In addition, symbol lengths (subcarrier spacings) of OFDM signals of the UEs #3 and #4 are equal to those of the UEs #1 and #2.

For example, in each of the subframes 221 to 223 for the traffic of the UEs #3 and #4, the DL is allocated to the top twelve symbols and muting is allocated to a remaining time period. In addition, in the subframe 224 for the traffic of the UEs #3 and #4, the UL is allocated to the top twelve symbols and muting is allocated to a remaining time period. The time periods for the muting may be set to be shorter than the symbol lengths of OFDM signals used by the UEs #3 and #4.

In the example illustrated in FIG. 9, the base station 110 allocates the frequency bands 211 to 213 to the UE #1 for the second time periods 242. The UE #1 uses the frequency bands 211 to 213 to execute radio transmission in the UL during the second time periods 242 based on results of the scheduling by the base station 110.

As illustrated in FIG. 9, the UE #1 (first terminal 121) may execute radio transmission by using the frequency band 211 (first frequency band) and the frequency bands 212 to 214 (second frequency bands) during at least any of the second time periods 241 to 244 of the subframes. This may improve the efficiency of using radio resources.

In this manner, the first terminal 121 according to the second embodiment executes radio transmission between the first terminal 121 and the base station 110 in the UL or the DL during each of the first time periods of the predetermined time intervals (subframes). In addition, during each of the second time periods of the predetermined time intervals, the first terminal 121 executes radio transmission between the first terminal 121 and the base station 110 in a link in a direction opposite to a first time period. In addition, the second terminal 122 executes radio transmission between the second terminal 122 and the base station 110 in a link in the same direction as the first terminal 121 during each of the first time periods of the predetermined time intervals and does not execute radio transmission between the second terminal 122 and the base station 110 during the second time periods.

Thus, the transmission of data and the transmission of a response signal to the data in the communication of the first terminal 121 that executes radio transmission in the UL and the DL in each of the predetermined time intervals may be executed at time intervals shorter than those in the communication of the second terminal 122 that executes radio transmission in either one of the UL and the DL in each of the predetermined time intervals. Thus, the communication of the first terminal 121 causes lower latency than the communication of the second terminal 122. It is, therefore, possible to frequency-multiplex the communication (communication of the first terminal 121) in which a delay amount is small and the communication (of the second terminal 122) in which a delay amount is large.

In addition, since the symbol lengths of OFDM signals of the first and second terminals 121 and 122 are equal to each other, the OFDM signals of the first and second terminals 121 and 122 may be orthogonal to each other. Thus, for example, the signals in the communication may be separated on a receiving side without the use of the low sidelobe modulation scheme such as FBMC or F-OFDM, for example.

In addition, the base station 110 may switch between the scheduling that is illustrated in FIGS. 8 and 9 and to be executed to set the symbol lengths of the UEs to be equal to each other and the scheduling that is illustrated in FIGS. 2 and 3 and to be executed to set a symbol length for each of the UEs and execute the scheduling illustrated in FIGS. 8 and 9 to set the symbol lengths of the UEs to be equal to each other or execute the scheduling illustrated in FIGS. 2 and 3 to set a symbol length for each of the UEs.

As described above, according to the communication system, the communication method, and the base station, multiple types of communication in which delay amounts are different may be frequency-multiplexed.

For example, although the 3GPP has started considering a 5G system, but is planning to introduce a new radio interface (new RAT) that is not compatible with conventional LTE and LTE-Advanced. 3GPP stands for 3rd Generation Partnership Project. RAT stands for Radio Access Technology.

One of characteristics of 5G is that communication of various types of traffic that has various traffic characteristics and for which various quality requirements are requested may be supported. New RAT design that causes various types of traffic to be included in the same carrier has been requested. Devices that use New RAT include IoT (Internet of Things) devices.

In an OFDM-based multicarrier transmission technique, design that causes traffic for which different requirements are requested to be mapped to resources to which appropriate parameters have been applied and causes the traffic to be included in the same carrier in the same frame has been considered as a promising technique. The parameters are, for example, subcarrier spacings, TTIs, CP lengths, and the like.

Since orthogonality between subcarriers of normal OFDM signals is degraded in the case where radio resources to which different parameters are applied are multiplexed, the resources are to be isolated by a filter, for example. Due to the difference between the filtering methods, multiple transmission schemes have been proposed. The transmission schemes are, for example, FBMC (Filter Bank Multi-Carrier), F-OFDM (Filtered-OFDM), and the like.

For example, for traffic for which low latency is requested, it is effective to set short symbol lengths by increasing subcarrier spacings and transmit a single packet in a short TTI. In addition, in order to achieve low latency, the self-contained subframe technique for setting a DL period and a UL period in the same TTI and reducing latency requested for response signal (ACK/NACK) feedback for a received packet has been proposed.

On the other hand, requests for latency and the maximum transmission rate are not severe for a portion of traffic from a low-cost and battery-driven IoT device such as a sensor, but it is requested to prioritize a request for the securement of wide coverage and low consumption power. For the traffic, it is effective to allocate a long TTI frame set for a radio resource using a single subcarrier signal or a multi-carrier signal of a narrow band obtained by reducing a subcarrier spacing.

The aforementioned self-contained subframe technique presupposes application to a TDD system. If multiple radio resources of the aforementioned different parameters are multiplexed in the TDD system, the efficiency (multiplexing efficiency) of using radio resources may be low. This is due to the fact that boundaries between DL time periods and UL time periods are set in units of the maximum symbol length among symbol lengths of signals to be frequency-multiplexed in TDD.

On the other hand, according to the aforementioned embodiments, in the systems using TDD for the DL and the UL, the first terminal 121 executes transmission in the DL and the UL in each of the subframes. In addition, the second terminal 122 executes transmission in either one of the DL and the UL simultaneously with the first terminal 121 and does not execute transmission in the other one of the DL and the UL in each of the subframes. Thus, for example, since the frequency multiplexing may be executed using the self-contained subframe technique for a short TTI length and a non-self-contained subframe technique for a long TTI length in the same time period, the efficiency of using radio resources may be improved.

For example, in the communication system 100, communication is executed using a certain radio channel (system band) between the base station and two or more terminals. In addition, in a certain time interval (subframe), in the communication system 100, a DL signal and a UL signal are time-multiplexed using different frequencies in a radio channel in communication with terminals.

Then, in the communication system 100, in a partial uplink or downlink signal period of communication between the base station and a certain terminal, a non-transmission period (muting) is set for communication between the base station and another terminal. Thus, since frequency multiplexing may be executed using the self-contained subframe for a short TTI and the non-self-contained subframe for a long TTI in the same time period, the efficiency of using radio resource may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system for a time division duplex communication, the communication system comprising:
    a base station configured to operate in a time division duplex mode, in which a frame formed in a first frequency band includes at least a first time period and a second time period in a time direction;
    a first terminal configured to
        execute first radio communication between the first terminal and the base station in the first frequency band during the first time period, the first radio communication being configured to perform either one of an uplink communication and a downlink communication during the first time period, and
        execute second radio communication between the first terminal and the base station in the first frequency band during the second time period after the first time period, the second radio communication being configured to perform the uplink communication when the first radio communication is configured to perform the downlink communication, the second radio communication being configured to perform the downlink communication when the first radio communication is configured to perform the uplink communication; and a second terminal that is different from the first terminal and is configured to
  execute third radio communication between the second terminal and the base station in the first frequency band during the first time period, the third radio communication being configured to perform the uplink communication when the first radio communication is configured to perform the uplink communication, the third radio communication being configured to perform the downlink communication when the first radio communication is configured to perform the downlink communication, and
  does not execute the third radio communication between the second terminal and the base station in the first frequency band during the second time periods.

2. The communication system according to claim 1, wherein the first terminal executes the first and second radio communication between the first terminal and the base station by using an orthogonal frequency division multiplexed signal with a first symbol length, and
wherein the second terminal executes the third radio transmission between the second terminal and the base station by using an orthogonal frequency division multiplexed signal with a second symbol length longer than the first symbol length.

3. The communication system according to claim 2, wherein the lengths of the second time periods are shorter than the second symbol length.

4. The communication system according to claim 1, wherein the first terminal executes the first and second radio communication between the first terminal and the base station by using orthogonal frequency division multiplexed signals with a first symbol length,
wherein the second terminal executes the third radio communication between the second terminal and the base station by using orthogonal frequency division multiplexed signals with the first symbol length same as the first terminal.

5. A communication method to be executed in a communication system for a time division duplex communication, the communication system including a base station, a first terminal, and a second terminal, the base station being configured to operate in a time division duplex mode in which a frame formed in a first frequency band includes at least a first time period and a second time period in a time direction, the communication method comprising:
  causing the first terminal to execute first radio communication between the first terminal and the base station in the first frequency band during the first time period, the first radio communication being configured to perform either one of an uplink communication and a downlink communication during the first time period, and
  causing the first terminal to execute second radio communication between the first terminal and the base station in the first frequency band during the second time period after the first time period, the second radio communication being configured to perform the uplink communication when the first radio communication is configured to perform the downlink communication, the second radio communication being configured to perform the downlink communication when the first radio communication is configured to perform the uplink communication; and
  causing the second terminal to execute third radio communication between the second terminal and the base station in the first frequency band during the first time period, the third radio communication being configured to perform the uplink communication when the first radio communication is configured to perform the uplink communication, the third radio communication being configured to perform the downlink communication when the first radio communication is configured to perform the downlink communication, and
  causing the second terminal not to execute the third radio communication between the second terminal and the base station in the first frequency band during the second time periods.

6. A base station of a communication system for a time division duplex communication, the base station comprising:
  a communication circuit configured to operate in a time division duplex mode, in which a frame formed in a first frequency band includes at least a first time period and a second time period in a time direction; and
  a controller configured to
  control a first terminal so as to cause the first terminal to execute first radio communication between the first terminal and the base station in the first frequency band during the first time period, and second radio communication between the first terminal and the base station in the first frequency band during the second time period after the first time period, the first radio communication being configured to perform either one of an uplink communication and a downlink communication during the first time period, the second radio communication being configured to perform the downlink communication when the first radio communication is configured to perform the uplink communication, and
  control a second terminal so as to cause the second terminal to execute third radio communication between the second terminal and the base station in the first frequency band during the first time period and so as to inhibit the second terminal from executing the third radio transmission between the second terminal and the base station during the second time periods, the third radio communication being configured to perform the uplink communication when the first radio communication is configured to perform the uplink communication, the third radio communication being configured to perform the downlink communication when the first radio communication is configured to perform the downlink communication.

* * * * *